United States Patent
Hildesheim et al.

(10) Patent No.: US 9,720,843 B2
(45) Date of Patent: Aug. 1, 2017

(54) ACCESS TYPE PROTECTION OF MEMORY RESERVED FOR USE BY PROCESSOR LOGIC

(71) Applicant: Intel Corporation, Santa Clara, CA (US)

(72) Inventors: Gur Hildesheim, Haifa (IL); Shlomo Raikin, Ofer (IL); Ittai Anati, Haifa (IL); Gideon Gerzon, Zichron Yaakov (IL); Hisham Shafi, Akko (IL); Alex Berenzon, Zikhron Yakov (IL); Geoffrey S. Strongin, Tigard, OR (US); Iris Sorani, Nahariya (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,439

(22) Filed: Dec. 28, 2012

(65) Prior Publication Data
US 2014/0189261 A1    Jul. 3, 2014

(51) Int. Cl.
G06F 12/00 (2006.01)
G06F 12/1027 (2016.01)
G06F 12/14 (2006.01)

(52) U.S. Cl.
CPC ........ *G06F 12/1027* (2013.01); *G06F 12/145* (2013.01); *G06F 12/1441* (2013.01); *G06F 2212/1052* (2013.01)

(58) Field of Classification Search
CPC ...... G06F 3/0647; G06F 3/0604; G06F 3/067; G06F 2003/0697
(Continued)

(56) References Cited

U.S. PATENT DOCUMENTS 5,513,337 A    4/1996    Gillespie et al.
2002/0027825 A1*    3/2002    Forbes et al. ............ 365/230.06
(Continued)

FOREIGN PATENT DOCUMENTS

CN    102257483 A    11/2011
WO    2014/105122 A1    7/2014

OTHER PUBLICATIONS

International Search Report received for PCT Patent Application No. PCT/US2013/045691, mailed on Nov. 14, 2013, 5 pages.
(Continued)

*Primary Examiner* — Gurtej Bansal
(74) *Attorney, Agent, or Firm* — Vecchia Patent Agent, LLC

(57) ABSTRACT

A processor of an aspect includes operation mode check logic to determine whether to allow an attempted access to an operation mode and access type protected memory based on an operation mode that is to indicate whether the attempted access is by an on-die processor logic. Access type check logic is to determine whether to allow the attempted access to the operation mode and access type protected memory based on an access type of the attempted access to the operation mode and access type protected memory. Protection logic is coupled with the operation mode check logic and is coupled with the access type check logic. The protection logic is to deny the attempted access to the operation mode and access type protected memory if at least one of the operation mode check logic and the access type check logic determines not to allow the attempted access.

34 Claims, 15 Drawing Sheets

(58) Field of Classification Search
USPC .......................................... 711/147, 156, 163
See application file for complete search history.

(56) References Cited

U.S. PATENT DOCUMENTS

| | | |
|---|---|---|
| 2004/0078590 A1 | 4/2004 | Ellison et al. |
| 2007/0083916 A1* | 4/2007 | Coyle ................................ 726/4 |
| 2008/0276051 A1 | 11/2008 | Renno |
| 2009/0113141 A1* | 4/2009 | Bullman et al. .............. 711/147 |
| 2009/0276844 A1 | 11/2009 | Gehrmann et al. |
| 2010/0223447 A1* | 9/2010 | Serebrin ....................... 712/225 |
| 2012/0042144 A1 | 2/2012 | Grisenthwaite |
| 2012/0324150 A1* | 12/2012 | Moshayedi et al. ........... 711/103 |

OTHER PUBLICATIONS

International Preliminary Report on Patentability and Written Opinion Received for PCT Patent Application No. PCT/US2013/045691, mailed on Jul. 9, 2015, 6 pages.
Office Action and Search Report Received for Chinese Patent Application No. 201380062341.5, mailed on Nov. 10, 2016, 14 pages of Chinese Office Action Only.

* cited by examiner

ACCESS TYPE PROTECTED
MEMORY SPECIFICATION REGISTER
WITH EXPLICIT ACCESS TYPE
210A

| BASE ADDRESS 230 | ADDRESS MASK 231 | VALIDITY (OPTIONAL) 232 | LOCK (OPTIONAL) 233 | ACCESS TYPE (E.G., READ, WRITE, EXECUTE, COMBINATION, ETC.) 211 |

*FIG. 2A*

ACCESS TYPE PROTECTED
MEMORY SPECIFICATION REGISTER
WITH IMPLICIT ACCESS TYPE
210B

| BASE ADDRESS 230 | ADDRESS MASK 231 | VALIDITY (OPTIONAL) 232 | LOCK (OPTIONAL) 233 |

*FIG. 2B*

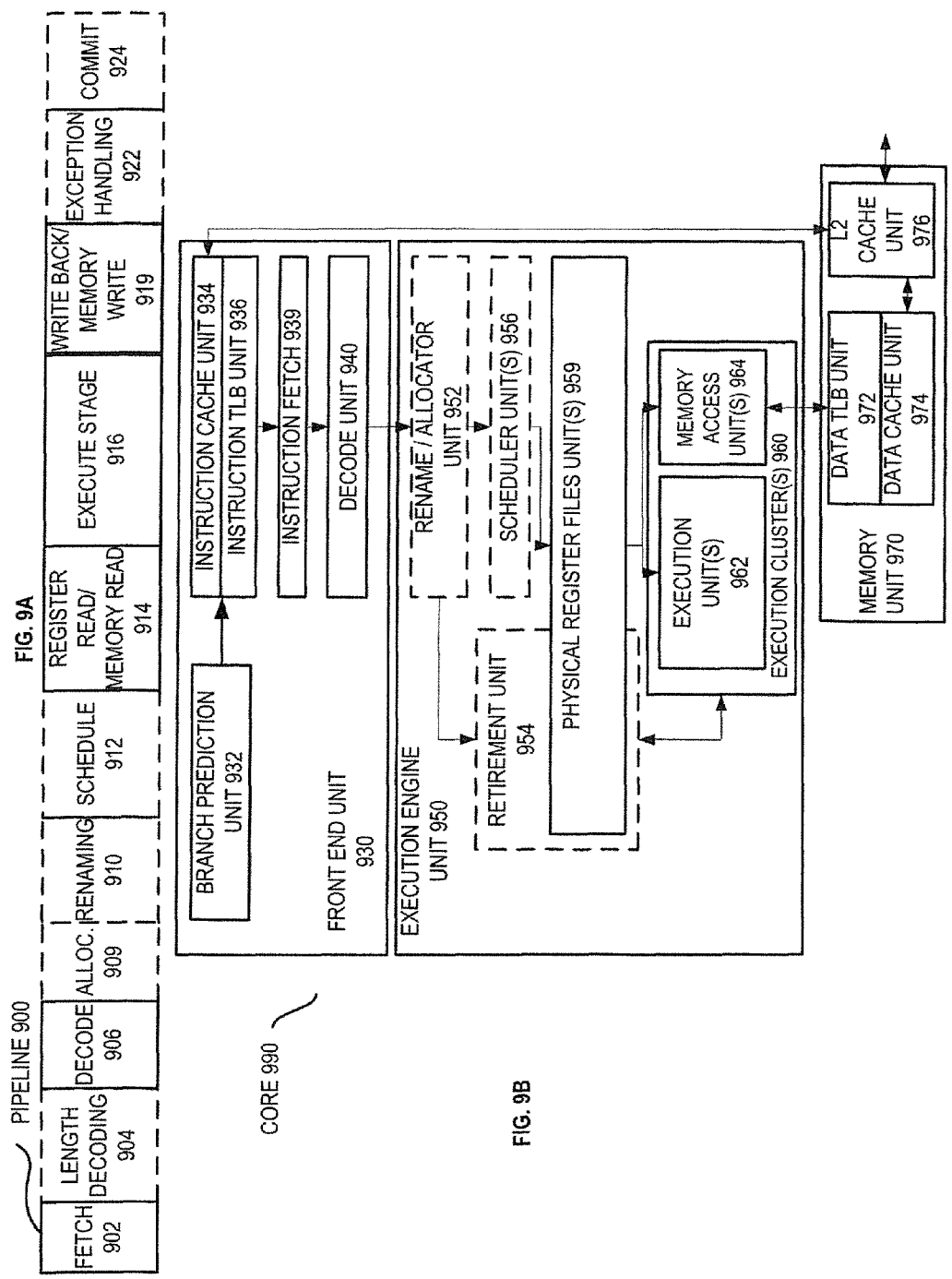

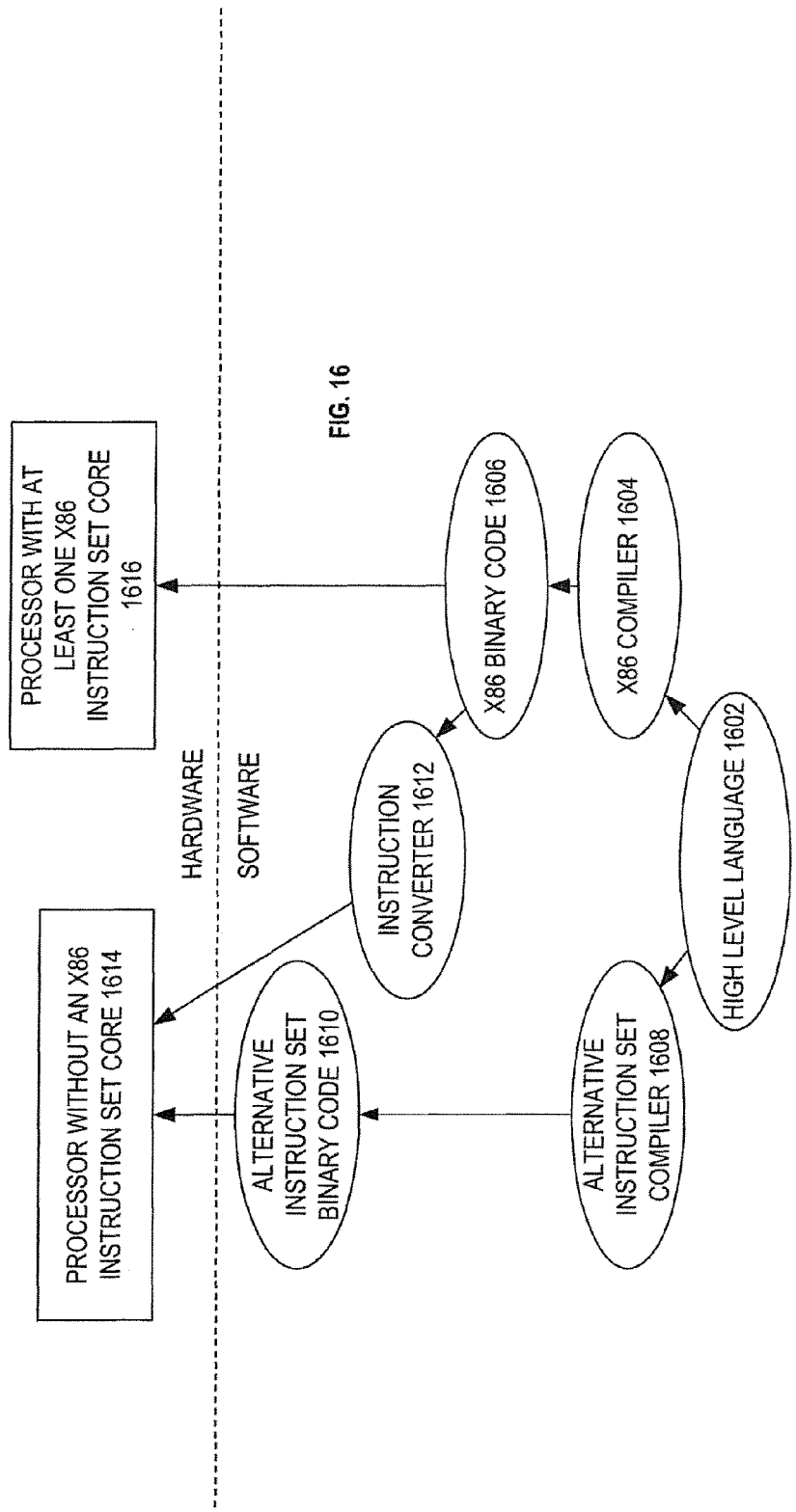

ACCESS TYPE PROTECTION OF MEMORY RESERVED FOR USE BY PROCESSOR LOGIC

BACKGROUND

Field

Embodiments relate to the field of processors. In particular, embodiments relate to the field of processors to restrict accesses to portions of memory.

Background Information

Some processors have a mechanism to reserve a portion of physical memory for use by firmware of the processor, or other on-die processor logic, but not for use by software executing in the processors. By way of example, the portion of the physical memory may be configured by firmware of the processor, a Basic Input/Output System (BIOS), or otherwise. During operation, the mechanism may monitor attempted accesses to the portion of the physical memory, and determine whether or not the attempted accesses should be allowed. In such processors, the protection of the portion of the physical memory is based on the operation mode of the attempted access (e.g., whether the on-die processor logic or the software is attempting the access). If the attempted accesses are from the on-die processor logic they may be allowed, or if the attempted accesses are from the software executing in the processor they may not be allowed.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 2A is a block diagram of an embodiment of an access type protected memory specification register with an explicit access type.

FIG. 2B is a block diagram of an embodiment of an access type protected memory specification register with an implicit access type.

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIG. 16 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth (e.g., specific register contents and layouts, specific logic implementations, specific sequences of operations, specific logic partitioning/integration details, types and interrelationships of system components, and the like). However, it is understood that embodiments of the invention may be practiced without these specific details. In other instances, well-known circuits, structures and techniques have not been shown in detail in order not to obscure the understanding of this description.

One limitation with restricting an attempted access to a portion of physical memory based only on an operation mode of the attempted access (e.g., whether on-die processor logic or software is attempting the access), as described in the background section, is that there is no consideration of an access type of the attempted access (e.g., whether the attempted access is a read, a write, an execute, etc.). As a result, a portion of physical memory that is intended or desired to have one type of allowed access may instead be accessed by another, different, non-intended type of access. For example, a portion of physical memory intended to be accessed as read-only may instead be written to and/or executed from. The on-die processor logic may be able to perform such a non-intended type of access even if the operation mode based checking and protection mechanism is functioning properly. In addition, an entity other than the on-die processor logic, for example software executing in the processor, may be able to perform such a non-intended type of access if the operation mode based checking and protection mechanism has been compromised (e.g., by a bug, malware, tampering, etc.). In such cases, the intended or desired access types for these portions of the physical memory may be violated.

Disclosed herein are processors, methods, and systems, that are operable to protect portions of memory, which are reserved for on-die processor logic, based at least in part on the access types of the attempted accesses. Advantageously, these processors, methods, and systems may help to increase overall security. Restricting attempted accesses to portions of memory, based on the types of the attempted accesses, may help to further protect the portions of the memory, even from the on-die processor logic. This may help to enforce a principle of least privilege in which each entity is only allowed to do the things it needs to do in order to accomplish its intended tasks and no more. In addition, this may help to provide defense in depth in which, even if the operation mode checking and protection mechanism is compromised, the access type checking and protection mechanism may help to provide another level of defense.

Figure 1:
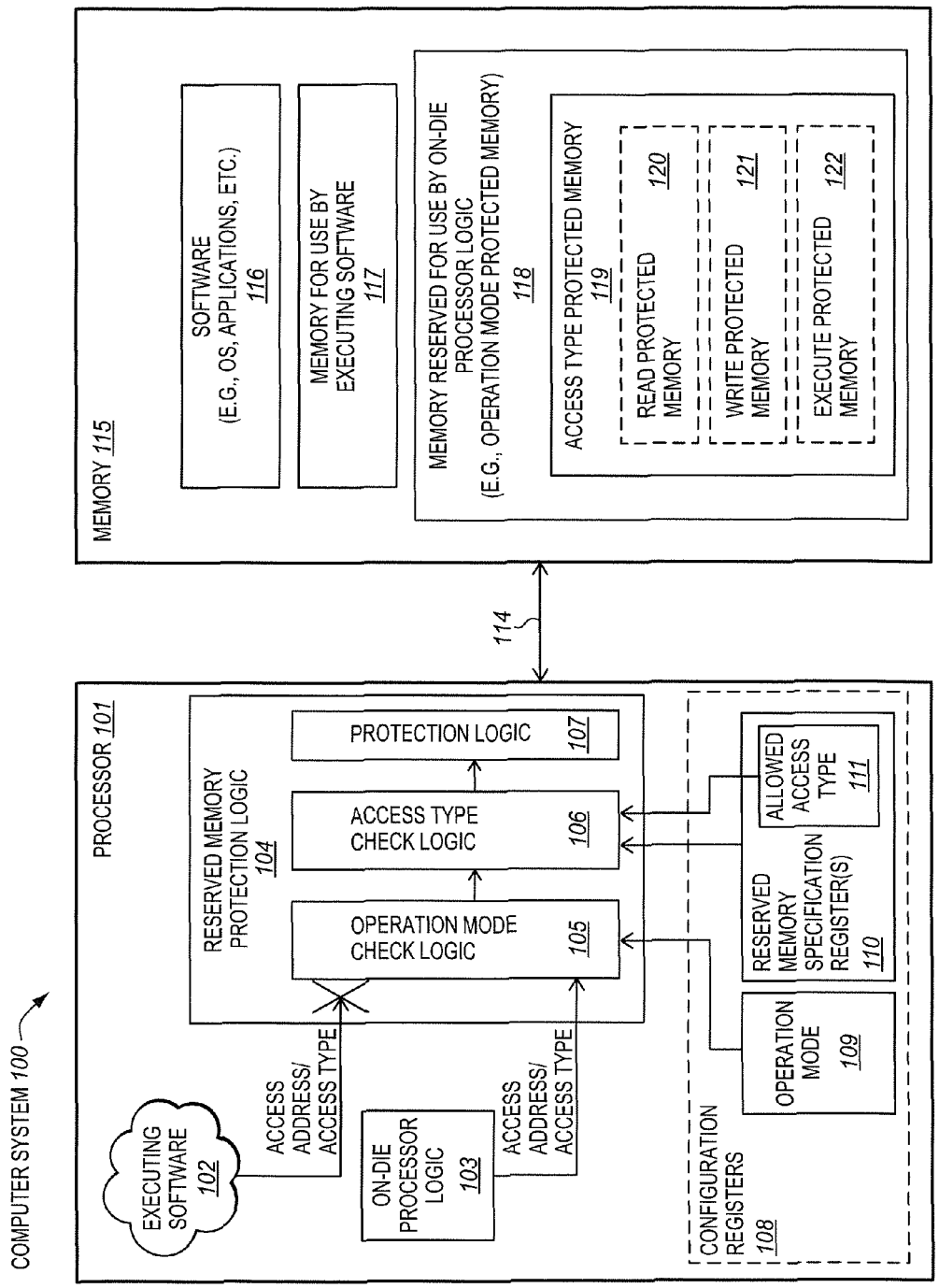
FIG. 1 is a block diagram of an embodiment of a computer system including a processor and a memory.

FIG. 1 is a block diagram of an embodiment of a computer system 100 including a processor 101 and a memory 115. The processor and the memory are coupled, or otherwise in communication with one another, by a conventional coupling mechanism 114 (e.g., through one or more buses, hubs, memory controllers, chipset components, or the like). The memory represents physical memory and may include one or more different memory devices and/or one or more different types of memory.

In some embodiments, the processor may be a general-purpose processor (e.g., of the type used in desktop, laptop, server, and like computers). Alternatively, the processor may be a special-purpose processor. Examples of suitable special-purpose processors include, but are not limited to, communications processors, network processors, cryptographic processors, graphics processors, co-processors, embedded processors, digital signal processors (DSPs), and controllers (e.g., microcontrollers), to name just a few examples.

Referring again to FIG. 1, the memory includes software 116. The software may include, for example, one or more operating systems (OS), one or more applications, or the like. During operation, a portion of the software may execute on the processor as executing software 102. The executing software may include macroinstructions or instruction set architecture (ISA) level instructions that are loaded from the software 116 and executed on the processor (e.g., scheduled, decoded, executed, etc.). The ISA level instructions are part of the ISA. The ISA represents the part of the architecture of the processor related to programming and commonly includes the native instructions, architectural registers, data types, addressing modes, and the like, of the processor. The ISA is distinguished from the microarchitecture, which generally represents the particular processor design techniques selected to implement the ISA. The executing software may utilize memory subset 117, which is a portion of the memory 115, which is allowed to be used by the executing software.

The processor 101 includes on-die processor logic 103. The on-die processor logic is fixed, resident, or persistent on-die (e.g., as opposed to software instructions that are loaded into the processor from the memory 115). Commonly, the on-die processor logic is present on the processor even when the processor is powered off, prior to booting, and/or at the time of completion of manufacture. Examples of suitable on-die processor logic include, but are not limited to, processor firmware, processor hardware (e.g., integrated circuitry), other on-die permanent logic of the processor, or a combination thereof. By way of example, firmware may include a combination of persistent and/or non-volatile memory of the processor (e.g., ROM, EPROM, flash memory, etc.) and instructions (e.g., microcode, microinstructions, microarchitectural instructions, instructions at a level closer to the circuitry/microarchitecture of the processor than ISA level instructions, etc.) stored in the persistent and/or non-volatile memory.

An embodiment of reserved memory 118, which is a portion of the memory 115, is reserved for use by the on-die processor logic 103 but not for use by the executing software 102. In some embodiments, the on-die processor logic may be allowed to access and use the reserved memory, but the executing software may not be allowed to access or use the reserved memory. The on-die processor logic is a particular subset of the total on-die processor logic, such as, for example, particular on-die security-related logic, which alone is intended to use the operation mode protected memory. The memory 115 also includes access type protected memory 119 that is protected based on the type of the access. As shown, in some embodiments, the access type protected memory is part of the reserved memory. In such embodiments, the access type protected memory may be protected based on both the operation mode (e.g., whether or not the on-die processor logic is the source of the access) as well as based on the type of the access. In other embodiments, the access type protected memory, or a portion thereof, need not be operation mode protected memory. As shown, in some embodiments, the access type protected memory may include different types of access type protected memory, such as, for example, a read protected memory 120, a write protected memory 121, and an execute protected memory 122. Other types of access type protected memory are also contemplated (e.g., write and execute, read and write protected, other combinations of two or more types of accesses, etc.).

In some embodiments, the processor may include one or more reserved memory specification registers 110 that are operable to specify one or more attributes of the reserved memory 118. Examples of suitable attributes include, but are not limited to, a location of the reserved memory, a size of the reserved memory, whether or not the reserved memory is valid or invalid (e.g., turned on or off), whether or not the reserved memory specification register(s) are locked, and the like. In some cases, the reserved memory specification register(s) may specify the range of the reserved memory and may be referred to as range registers.

In some embodiments, the one or more reserved memory specification registers 110 may optionally include allowed access type information 111 corresponding to the access type protected memory 119. The allowed access type information may indicate one or more allowed types of access for the access type protection memory. As used herein, indicating allowed types of access includes explicitly specifying allowed types of access, implicitly indicating allowed types of access, indirectly specifying the allowed types of access by explicitly specifying non-allowed types of access, and combinations thereof. In some embodiments, there may be a different set of allowed access type indication information 111 and/or a different reserved memory specification register 110 for different access type protected memories (e.g., for each of the read protected memory 120, the write protected memory 121, and the execute protected memory 122).

As shown, the reserved memory specification register(s) may optionally be included in a set of configuration registers 108 of the processor. Alternatively, the aforementioned attributes may be specified in other locations (e.g., in the on-die processor logic, a memory management unit (not shown), or elsewhere). By way of example, the reserved memory specification registers may be configured by a Basic Input/Output System (BIOS), firmware, or otherwise. Alternatively, rather than being explicitly specified or configured, one or more of the aforementioned attributes may be implicit (e.g., the location of the reserved memory may be predefined or otherwise implicit, the allowed access type of memory portion may be predefined or otherwise implicit, etc.).

During operation the processor may monitor attempted accesses to the reserved memory 118 and determine whether or not the attempted accesses are to be allowed or not. The processor includes an embodiment of reserved memory protection logic 104. The reserved memory protection logic is commonly on-die logic of the processor, for example hardware, firmware, or a combination thereof. In some embodiments, the reserved memory protection logic may reside in the memory management subsystem (e.g., in the page miss handler, in a load/store unit, or the like). Accesses from the on-die processor logic 103 and from the execution software 102 may each have a corresponding access address. For example, such access addresses may correspond to instructions (e.g., macroinstructions and/or microinstructions) attempting the accesses. By way of example, a load microinstruction may specify a physical address in the reserved memory. The reserved memory protection logic 104 may know the location and size of the reserved memory 118. For example, the reserved memory protection logic may receive the location and size of the reserved memory from the reserved memory specification register(s) 110. The reserved memory protection logic may determine whether or not the access address of the attempted access lies within the reserved memory. If the access address lies within the reserved memory and/or the access type protected memory, then operation mode check logic 105 and/or access type check logic 106 may be used to determine whether or not the attempted access should be allowed or prevented.

The reserved memory protection logic includes operation mode check logic 105. The operation mode check logic may be operable to allow or prevent access to the reserved memory based on an operation mode of an attempted access. In some embodiments, the operation mode may indicate whether or not the attempted access is from the on-die processor logic 103. For example, an operation mode 109 (e.g., a single bit) may have a first value (e.g., be set to binary one) if the on-die processor logic is attempting the access or may have a second, different value (e.g., be cleared to binary zero) if the on-die processor logic is not attempting the access (e.g., the executing software 102 is attempting the access). In some embodiments, the processor (e.g., the on-die processor logic or other firmware or hardware of the processor) may specify the operation mode based on whether or not the on-die processor logic is attempting to access the reserved memory. As shown, the operation mode may be included in the set of configuration registers 108. The operation mode basically indicates whether or not the particular on-die processor logic intended to access the operation mode protected memory is in fact the entity accessing the operation mode protected memory. Alternatively, the operation mode may be included in the on-die processor logic, a memory management unit (not shown), or elsewhere. As another option, the operation mode may also be associated with a microinstruction (e.g., as one of the attributes of the microinstruction) in the processor execution pipeline. The operation mode check logic may determine to allow accesses by the on-die processor logic or prevent accesses by entities other than the on-die processor logic (e.g., by the executing software 102). In the illustration, an "X" is used to indicate that the operation mode check logic may prevent access to the reserved memory by the executing software.

The reserved memory protection logic also includes an embodiment of access type check logic 106. The access type check logic may be operable to allow or prevent access to the access type protected memory 119 based on a type of an attempted access. Accesses from the on-die processor logic, and from the executing software, may each have a corresponding access type. For example, these access types may correspond to an instruction (e.g., a macroinstruction and/or a microinstruction) that is attempting the access. For example, a load instruction may attempt a read type of access, a store instruction may attempt a write type of access, etc. The access type check logic may receive these attempted types of accesses as well as the allowed access type(s) 111 that correspond to the access type protected memory. The access type check logic may be operable to check whether or not the attempted type of access matches the allowed access type(s). The access type check logic may determine to allow accesses when the attempted access type matches the allowed access type or prevent accesses when the attempted access type does not match the allowed access type. For example, an attempted read from the write protected memory 121 may be allowed but an attempted write to the write protected memory 121 may not be allowed.

Protection logic 107 may allow or prevent the attempted access based on the checks by the operation mode 105 and access type check 106 logics. In some embodiments, if either the operation mode or the access type is illegal the attempted access may be prevented. In some embodiments, in the event of an attempted illegal access, one or more additional protective actions may be taken. Examples of such actions include, but are not limited to, causing an exception (e.g., an interrupt, fault, trap, or the like), reporting the illegal attempt to an appropriate entity (e.g., the on-die processor logic or an operating system), stopping the executing software, or the like.

Advantageously, the ability to restrict attempted accesses to portions of memory based on the types of the attempted accesses may help to increase overall security. For one thing, it may help to enforce a principle of least privilege in which each entity is only allowed to do the things it needs to do in order to accomplish its intended tasks and no more. The access type check logic may help to further limit access, even by the on-die processor logic itself, to the access type protected memory based on the type of access. Intended or desired types of access may be allowed while unintended or undesired types of access may be prevented (even to the on-die processor logic which would otherwise satisfy the operating mode check). This represents an additional restriction in addition to the operation mode restriction. By way of example, without the access type check and protection logic the on-die processor logic may be allowed to write to the write protected memory 121 but with the access type check and protection logic the on-die processor logic may be prevented from writing to the write protected memory 121. For another thing, this ability may help to provide defense in depth in which, even if the operation mode checking and protection mechanism is compromised (e.g., by a bug, malware, tampering, etc.) the access type checking and protection mechanism may be able to provide another level of defense.

FIG. 2A is a block diagram of an embodiment of an access type protected memory specification register 210A with an explicit access type 211. In some embodiments, BIOS, firmware, appropriately privileged software, or the like, may configure or specify the register in order to specify the attributes of an access type protected memory (e.g., access type protected memory 119 in FIG. 1).

The register includes a base address field 230 to allow specification of a base address. The register includes an address mask field 231 to allow specification of an address mask. The base address may specify where the access type protected memory resides in physical memory. The address mask may specify the size of the access type protected memory. Further details of the suitable base addresses and address masks will be described further below.

The register includes an optional validity field 232. The validity field may allow a specification of whether or not the access type protected memory specification register and/or its corresponding access type protected memory is valid (e.g., is being used or not). For example, the access type checks and enforcement may only be performed when the valid bit is set or otherwise enabled. In this way, the valid bit may represent an on/off switch for the access type checking and enforcement mechanism.

The register includes an optional lock field 233 to allow the register to be locked. By way of example, after BIOS, firmware, or another appropriate entity has configured the register, that entity may enable the lock (e.g., by storing a predetermined value in the lock field). For example, a single bit lock field may be set to binary one to lock the register, or cleared to binary zero to unlock the register. Enabling the lock may help to prevent unauthorized modification of the register. As an example, the lock may be released (e.g., the register unlocked) when the system is shut down and/or a hardware reset occurs. The lock may remain unlocked until the BIPS or other entity configures the register and sets the lock.

The register includes an access type field 211 to allow explicit specification of one or more access types for the memory locations specified by the base address and the address mask. The specified access types may be either allowed access types or prohibited access types. For example, the access type field may specify whether any of read, write, execute, or some combination thereof, are allowed or prohibited. By way of example, write protected memory may be either specified as write prevented or read and execute permitted.

FIG. 2B is a block diagram of an embodiment of an access type protected memory specification register 210B with an implicit access type. The register includes a base address field 230, an address mask field 231, an optional validity field 232, and an optional lock field 233. The register, and each of these fields, may be similar to or the same as those described above in conjunction with FIG. 2A. To avoid obscuring the description, these similarities will not be repeated, but rather the discussion will emphasize the different or additional aspects of the register 210B.

The register omits an explicitly specified access type field. Instead, one or more access types are predefined or otherwise implicit for the register 210B. For example, the reserved memory protection logic 104 may understand that the memory portion corresponding to the register 210B (e.g., indicated by the base address field 230 and the address mask field 231) has a predefined or otherwise implicit allowed or prohibited access type. In some cases, different such registers may each have a different corresponding implicit access type for a different corresponding memory range.

It is to be appreciated that these are just example embodiments of suitable registers. Alternate embodiments may include a subset of the illustrated fields and/or may include additional fields. For example, some registers may have a validity field without a lock field, may have a lock field without a validity field, or may omit both of these fields but include additional fields. Moreover, the illustrated arrangement of the fields within the registers is not required, but rather the fields may be rearranged in many different ways. Each of the fields may be one or more bits in the register that are sufficient to specify the intended information for the particular implementation. The bits may be a physically contiguous sequence of bits, or may be dispersed throughout the register but logically grouped into the field, or a combination thereof.

Figure 3:
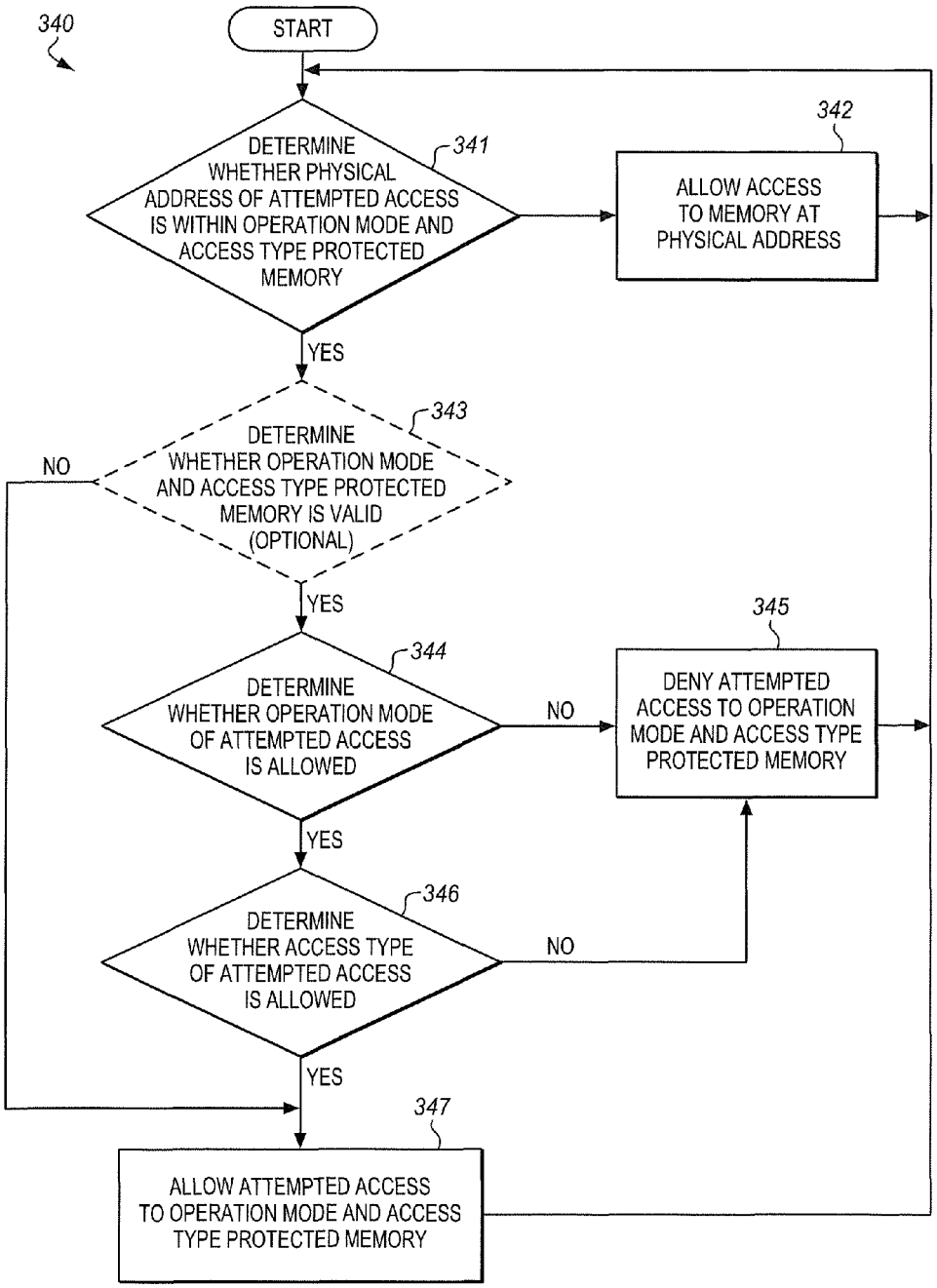
FIG. 3 is a block flow diagram of a detailed example embodiment of a method of checking and restricting accesses to an operation mode and access type protected memory.

FIG. 3 is a block flow diagram of a detailed example embodiment of a method 340 of checking and restricting accesses to an operation mode and access type protected memory. In some embodiments, the operations and/or method of FIG. 3 may be performed by and/or within the processor of FIG. 1. Alternatively, the operations and/or method of FIG. 3 may be performed by and/or within either a similar or an entirely different apparatus. Moreover, the processor of FIG. 1 may perform operations and/or methods either the same as, similar to, or entirely different than those of FIG. 3.

The method includes determining whether a physical address of an attempted access is within the operation mode and access type protected memory, at block 341. For example, this may include comparing the physical address of the attempted access with a base address field and an address mask field of a corresponding access type protected memory specification register. If the physical address of the attempted access is not within the operation mode and access type protected memory (i.e., "no" is the determination at block 341), then the attempted access to the memory at the physical address may be allowed at block 342. This means the physical address of the attempted access is outside of the operation mode and access type protected memory. Thereafter the method may revisit block 341 upon the next attempted access to memory.

Alternatively, if the physical address of the attempted access is within the operation mode and access type protected memory (i.e., "yes" is the determination at block 341) then the method may advance to block 343. At block 343, an optional determination may be made whether the operation mode and access type protected memory is enabled for access type checking and enforcement. This is optional not required. This may include examining a validity bit or field in the corresponding access type protected memory specification register. As previously mentioned, the validity may indicate whether or not protection of the access type protected memory is currently enabled or disabled. If it is invalid (i.e., "no" is the determination at block 341), then the method may advance to block 347, where the attempted access may be allowed to the operation mode and access type protected memory (e.g., since the protection mechanism is currently disabled or otherwise not valid).

Alternatively, if the operation mode and access type protected memory is valid (i.e., "yes" is the determination at block 343), then the method may advance to block 344. At block 344, a determination may be made whether the operation mode of the attempted access is allowed. This may include examining the current operating mode (e.g., a bit in a configuration register of the processor) and determining whether the current operating mode indicates that on-die processor logic is attempting the access or not. If on-die processor logic is attempting the access, then the operation mode of the attempted access may be allowed. Otherwise, if the on-die processor logic is not attempting the access (e.g., instead software executing on the processor is attempting the access), the operation mode of the attempted access may not be allowed.

If the operation mode of the attempted access is allowed (i.e., "yes" is the determination at block 344), the method may advance to block 346. At block 346, a determination may be made whether the access type of the attempted access is allowed. This may include comparing the access type of the attempted access with the allowed access type(s) for the operation mode and access type protected memory. As mentioned, in some cases the allowed access type(s) may be explicitly specified in or implicitly indicated by the corresponding access type protected memory specification register. If the attempted access type matches one of the allowed access type(s), then the attempted access type may be allowed. Otherwise, if the attempted access type is different than all of the allowed access type(s), then the attempted access type may not be allowed.

If either the operation mode of the attempted access is not allowed (i.e., "no" is the determination at block 344), or if the access type of the attempted access is not allowed (i.e., "no" is the determination at block 346), the method may advance to block 345. At block 345, the attempted access to the operation mode and access type protected memory may be denied. In some embodiments, other actions may also be taken (e.g., raising an exception, reporting the illegal access to a privileged entity, etc.). Thereafter, the method may revisit block 341 upon the next attempted access to memory.

Alternatively, if the access type of the attempted access is allowed (i.e., "yes" is the determination at block 346) the method may advance to block 347. At block 347, the attempted access to the operation mode and access type protected memory may be allowed. Both the checks of the operation mode and access type revealed that the attempted access was permissible. Thereafter, the method may revisit block 341 upon the next attempted access to memory.

This is just one illustrative example of a suitable method. Many variations on this method are contemplated. For example, the method has been described in a relatively basic form but operations may optionally be added to and/or removed from the methods. As one example, other embodiments may omit the validity check shown at block 343. As another example, other embodiments pertain to access type protection without operation mode protection. Moreover, while the flow diagram shows one possible order for the operations, alternate embodiments may perform the operations in different order, combine certain operations, overlap certain operations, etc.

Figure 4:
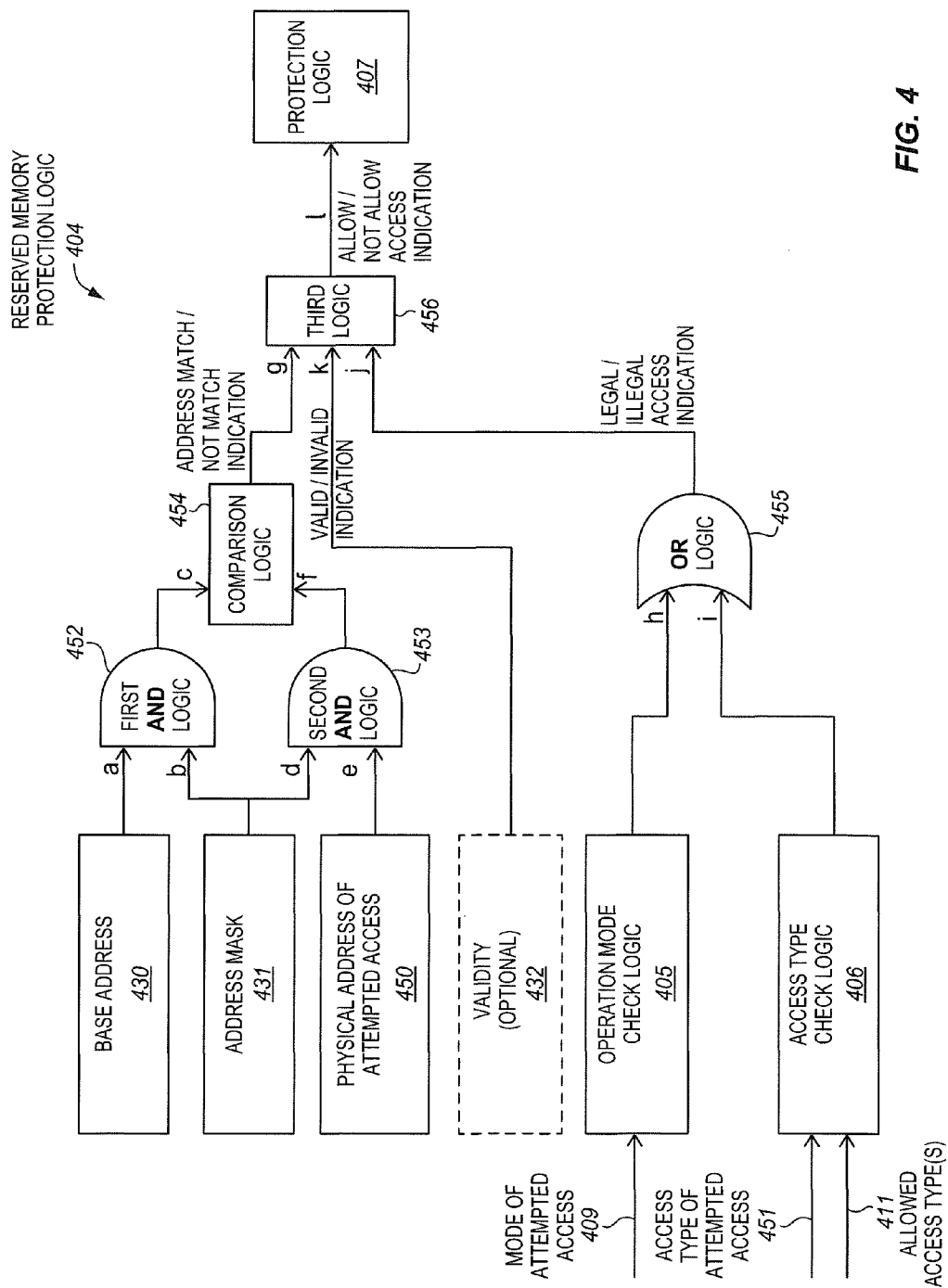
FIG. 4 is a block diagram of an embodiment of reserved memory protection logic.

FIG. 4 is a block diagram of an embodiment of reserved memory protection logic 404. In some embodiments, the reserved memory protection logic of FIG. 4 may be included in the processor of FIG. 1. Alternatively, the reserved memory protection logic of FIG. 4 may be included within either a similar or an entirely different apparatus. Moreover, the processor of FIG. 1 may include reserved memory protection logic either the same as, similar to, or entirely different than that of FIG. 4. Moreover, in some embodiments, the reserved memory protection logic of FIG. 4 may perform the operations and/or method of FIG. 3. Alternatively, the reserved memory protection logic of FIG. 4 may perform similar or entirely different operations and/or methods. Moreover, the operations and/or method of FIG. 3 may be performed by logic either the same as, similar to, or entirely different than that of FIG. 4.

A base address 430 is provided to an input (a) of a first AND logic 452. An address mask 431 is provided to an input (b) of the first AND logic. The address mask is also provided to an input (d) of a second AND logic 453. By way of example, the base address and the address mask may come from an access type protected memory specification register. A physical address of an attempted access is provided to an input (e) of the second AND logic. An output of the first AND logic is provided to an input (c) of a comparison logic 454. An output of the second AND logic is provided to an input (f) of the comparison logic. The comparison logic is operable to determine whether or not the physical address of the attempted access is within an operation mode and access type protected memory that is defined by the base address and address mask. The comparison logic provides an "address match/no match indication" to an input (g) of a third logic 456. An optional validity 432 may provide a "valid/invalid indication" to an input (k) of the third logic. By way of example, the validity may come from an access type protected memory specification register.

In some embodiments, the physical address of the attempted access may be considered to be inside the range of the operation mode and access type protected memory if (physical address 450 AND address mask 431) equals (base address 430 AND address mask 431). The base register may determine where the memory region resides in memory. In one aspect, a resolution of pages may be used (e.g., 4K bytes or 4096 bytes). So only address bits 12 and more significant may be used for the comparison and these bits need to be included in the reserved memory specification register. The address mask may determine the size of the reserved memory region. For example, if the address mask is all 1's, then the memory region may be only one page because the base address and the address mask need to be equal to create a match. If the address mask is "1 . . . 1111000" then the size of the region may be eight pages, since the lower 3-bits bits of the address may be "ignored" or "masked" while bits 15 and more significant may be used for the comparison and determine the result. Such a base address and address mask generally tend to be efficient to implement, since they may be evaluated with AND logic and a comparator. However, other ways of representing the memory region may also optionally be used instead.

A mode 409 of the attempted access may be provided to operation mode check logic 405. The operation mode check logic may provide a legal/illegal access indication to an input (h) of OR logic 455. An access type 451 of the attempted access may be provided to access type check logic 406. One or more allowed access types 411 corresponding to the operation mode and access type protected memory may also be provided to the access type check logic. By way of example, the one or more allowed access types may come from the access type protected memory specification register. The access type check logic may provide a legal/illegal access indication to an input (i) of the OR logic. The OR logic may provide a "legal/illegal access indication" to an input (j) of the third logic. If either the operation mode or the access type are determined to be illegal, then the OR logic may provide an illegal access indication. Alternatively, if both the operation mode and the access type are determined to be legal, then the OR logic may provide a legal access indication.

The third logic 456 may determine whether to allow or not allow the attempted access based on the indications provided on its inputs (g), (k), and (j). If an address no-match indication is provided on input (g), then the third logic may allow the attempted access. This generally means that the attempted access is not to the operation mode and access type protected memory region. If an invalid indication is provided on input (k) then the third logic may allow the attempted access. This may mean that the access protection mechanism is disabled, turned off, or otherwise not valid. Alternatively, an address match indication is provided on input (g), and a valid indication is provided on input (k), then the third logic may use the legal/illegal access indication provided on input (j) to determine whether or not to allow the attempted access. If the legal indication is provided, the attempted access may be allowed, whereas if the illegal indication is provided, then the attempted access may not be allowed. Protection logic 407 may allow or not allow the attempted access based on the determination by the third logic.

Figure 5:
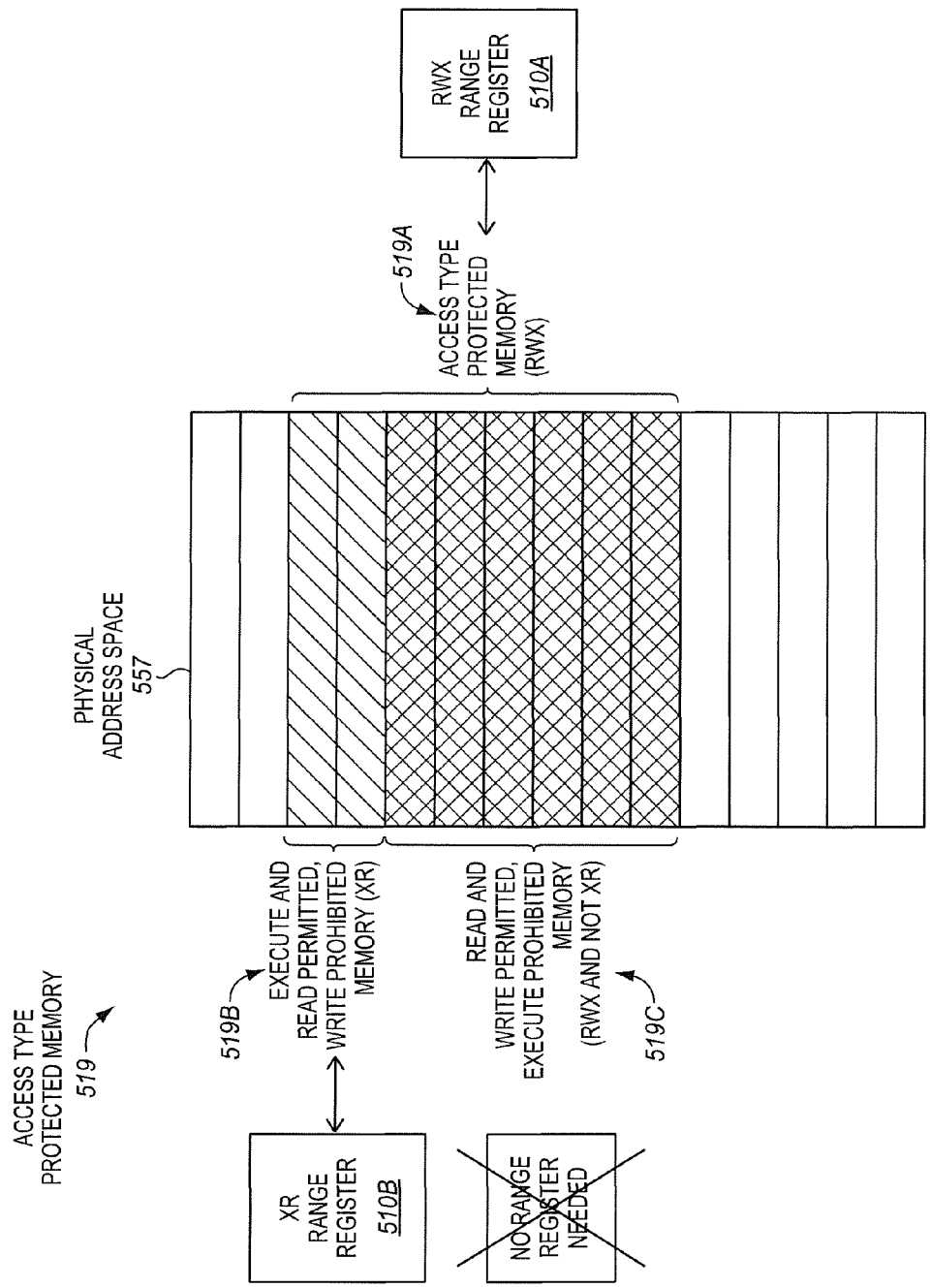
FIG. 5 is a block diagram of an embodiment of a set of access type protected memories.

FIG. 5 is a block diagram of an embodiment of a set of access type protected memories 519. The access type protected memories are in a physical address space 557. The access type protected memories include a read, write, and execute (RWX) permitted memory 519A, an execute and read (XR) permitted but write prohibited memory 519B (any attempt to write to this region will be aborted), and a read and write permitted but execute prohibited memory 519C (any attempt to execute from this region will be aborted). In some embodiments, all of these may be reserved for on-die processor logic. The RWX memory 519A has a corresponding RWX range register 510A. The XR memory has a corresponding XR range register 510B. In some embodiments, the read and write permitted but execute prohibited memory 519C may also have a corresponding range register (not shown). However, as shown, in some embodiments, the read and write permitted but execute prohibited memory 519C may not have a corresponding range register. Rather, in some embodiments, access to this memory 519C may be determined based on an evaluation of accesses (e.g., a logical combination of accesses) to one or more other access type protected memories of the set. That is, in some embodiments, access to one or some of the access type protected memories of a set may be evaluated based on a logical combination of accesses to other access type protected memories of the set. For example, access to the read and write permitted but execute prohibited memory 519C may be determined based on an access hit to the RWX memory 519A ANDNOT an access hit to the XR memory 519B. Advantageously, this may allow one or more specification registers to be eliminated, but is not required.

Other embodiments pertain to translation lookaside buffers (TLBs) that are operable to protect access type protected memory. TLBs are commonly used in processors and other apparatus that use virtual memory. A TLB may represent a cache that memory management hardware may use to improve virtual address translations. The TLB may be used to map virtual and physical address spaces. Virtual memory may represent the memory perspective from the view of software processes. Commonly, software processes use virtual addresses to search the TLB for corresponding physical addresses. A TLB hit occurs when a physical address for a virtual address is cached in the TLB. The retrieved physical address may then be used to access physical memory. Alternatively, a TLB miss may occur when the TLB does not cache a physical address for the virtual address. Commonly, in the event of such a TLB miss, a page walk may be performed in order to look up the virtual to physical translation in a page table often stored in physical memory. After the physical address is determined by performing the page walk, the mapping of the virtual address to the physical address may be cached or preserved in the TLB for future use. In this way, the TLB may effectively cache a subset of the page table.

Figure 6:
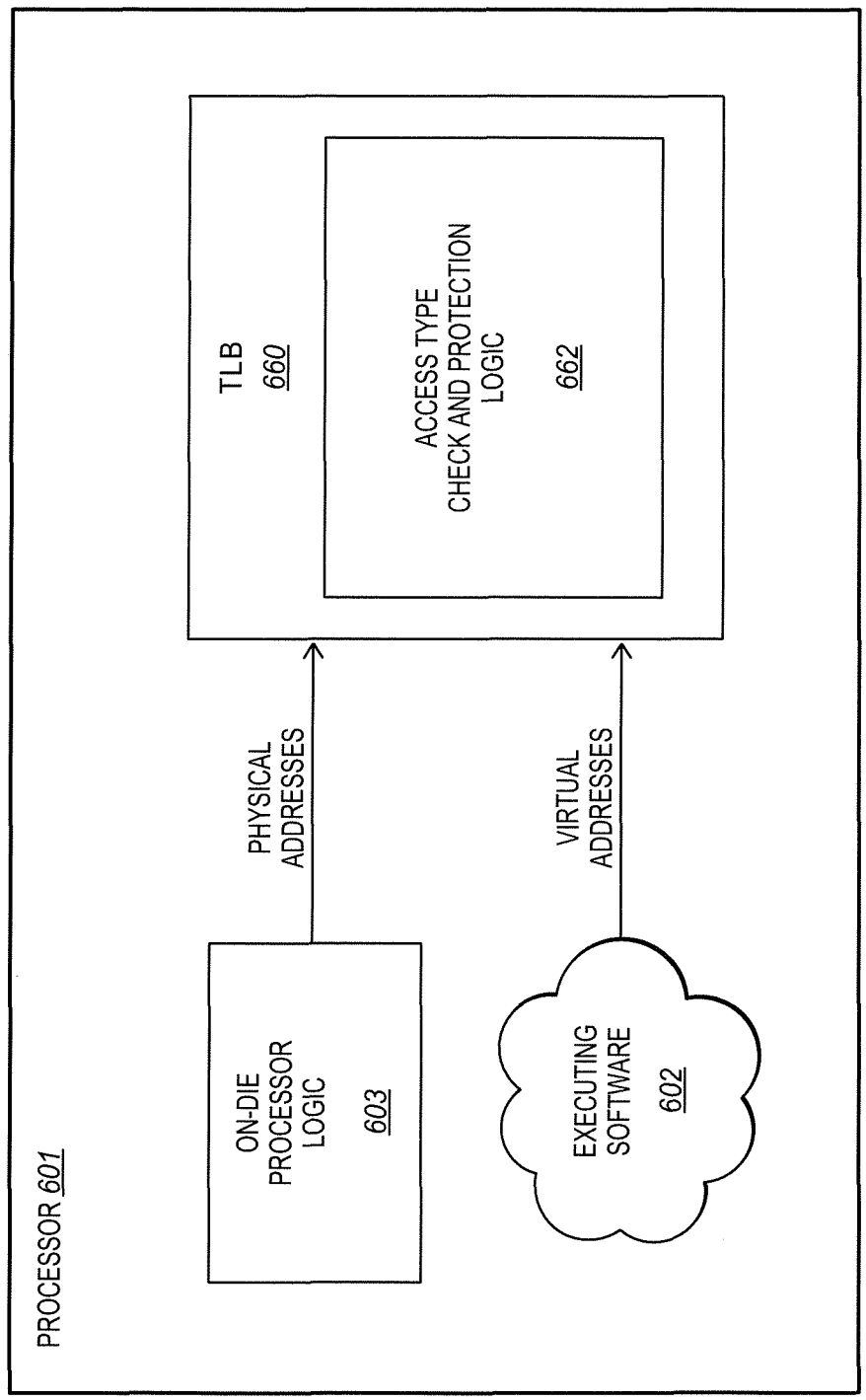
FIG. 6 is a block diagram of a processor having an embodiment of a TLB having access type check and enforcement logic.

FIG. 6 is a block diagram of a processor 601 having an embodiment of a TLB 660 having access type check and enforcement logic 662. The processor also has on-die processor logic 603 and (during use) executing software 602. The executing software may access the TLB with virtual addresses to obtain physical addresses, as previously described. In contrast, in some embodiments, the on-die processor logic may access the TLB using physical addresses. After access type protected memory has been accessed through the appropriate operation mode and access type check and protection logic, the translation may be cached in the TLB for future use and to speed up memory accesses. The TLB may help to avoid needing to go through the full operation mode and access type check and protection logic again. However, problems would occur if the TLB is not handled properly to enforce the access type restrictions. By way of example, initially a load operation may access a read allowed but write prohibited memory. After the load operation the translation may be stored in the TLB. In some embodiments, the TLB has the access type check and enforcement logic to prevent a subsequent non-allowed type of access, such as a store operation, from being able to use the TLB to write to the read allowed but write prohibited memory. However, in some embodiments, the access type check and enforcement logic 662 is operable to enforce access type restrictions for physical accesses to the TLB. The physical access is not done by software or the operating system but by the on-die processor logic. The type of access restrictions may be consistent with the access type protected memory for the physical address. For example, physical addresses corresponding to write protected memory 121 may not permit writes, etc.

Normally, the page miss handler does not perform a page walk for physical translations, since no paging is involved and the physical address is equal to the linear address. As a result, according to a conventional approach (with no access type protection for physical accesses), physical translations cached in the TLB may have all page attribute bits set to a "safe" value that provides maximal allowed access level (i.e., does not impose any access type restrictions). For example, the write bit or "w-bit" may automatically be set to binary one (i.e., "1") and the non-executable or "NX-bit" may be cleared to binary zero (i.e., to "0"). As a result, a TLB hit will typically be considered legal and would not cause a type of access violation.

Various different embodiments of the access type check and protection logic 662 are contemplated. In some embodiments, the entries of the TLB may indicate the access type restrictions for their corresponding physical translations.

Figure 7:
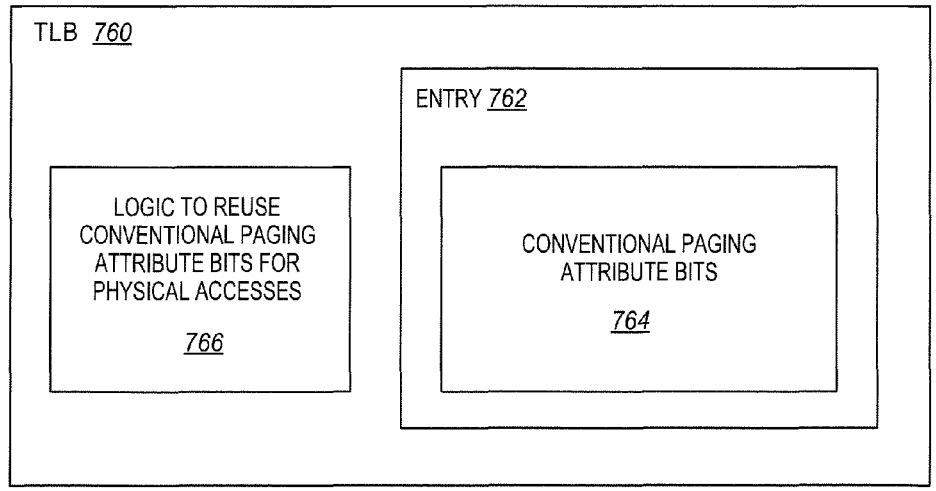
FIG. 7 shows a TLB having an entry having conventional paging attribute bits and logic to reuse the conventional paging attribute bits, but with a different interpretation, for physical accesses.

FIG. 7 shows a TLB 760 having an entry 762 having conventional paging attribute bits 764 and logic 766 to reuse the conventional paging attribute bits, but with a different interpretation, for physical accesses. The conventional existing paging attribute bits may have a conventional interpretation for accesses with virtual addresses (e.g., from the executing software). This may be according to the page tables. However, they may have a different interpretation for accesses with physical addresses (e.g., from the on-die processor logic). For example, in some embodiments, rather than being set to a "safe" value that provides maximal allowed access level (i.e., does not impose any access type restrictions), the conventional paging attribute bits may be set to values that indicate the appropriate access type restrictions. For example, if the translation is in a non-writeable region, then the write bit or "w-bit" of the TLB entry may be cleared to binary zero (i.e., "0"). As another example, if the translation is in a non-executable region, then the non-executable or "NX-bit" may be set to binary one (i.e., to "1"). Notice that these values are different than the conventional "safe" approach described a few paragraphs above. If the translation is in a non-readable execute only region, then it may not be cached in the TLB.

During a fill of the TLB, if the access is virtual, then the conventional TLB page attribute bits may be set according to the page tables. Alternatively, during the fill operation, if the access is physical, then the conventional TLB page attribute bits may be set according to the specified access type restrictions (e.g., according to the access type protected memory specification registers 210). Upon a TLB hit with an access type that violates the conventional TLB page attribute bits, if the access is virtual, then a page fault may be reported. Alternatively, upon a TLB hit with an access type that violates the conventional TLB page attribute bits, if the access is physical, then an action may be taken similar to the other access type violates described elsewhere herein (e.g., the access may be prevented and/or an operating system, firmware, or another appropriate privileged entity may be notified).

Figure 8:
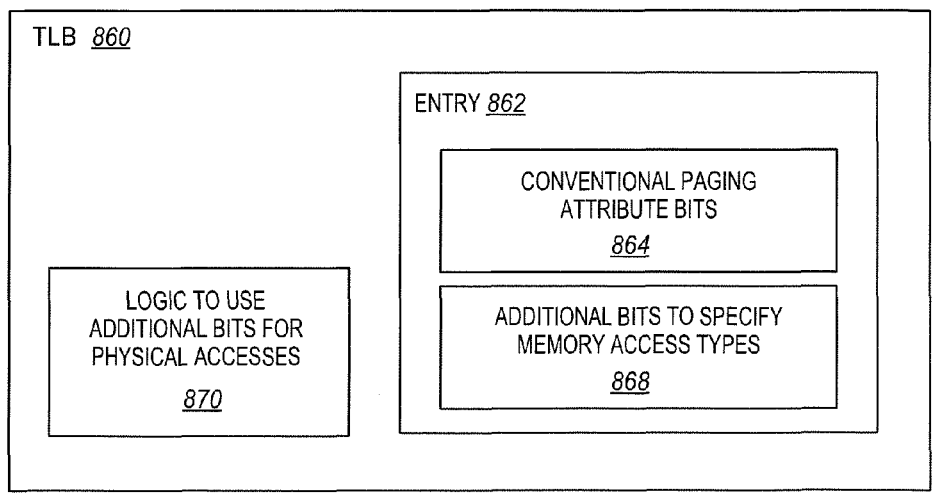
FIG. 8 shows a TLB having an entry having conventional paging attribute bits and additional bits to specify memory access types and logic to use the additional bits for physical accesses.

FIG. 8 shows a TLB 860 having an entry 862 having conventional paging attribute bits 864 and additional bits 868 to specify memory access types and logic 870 to use the additional bits 868 for physical accesses. The conventional paging attribute bits may have a conventional interpretation for accesses with virtual addresses (e.g., from the executing software). This may be according to the page tables. However, the additional bits 868 may be used for physical accesses (e.g., from the on-die processor logic). By way of example, in one embodiment, a physical write or "physical w-bit" may be added to specify whether or not write type accesses are allowed and a physical execute or "physical X-bit" may be added to specify whether execute type accesses are allowed. These may be added to each TLB entry. This may tend to increase the size and cost of the TLB, but may be appropriate for certain implementations.

In yet another embodiment, the TLB may not be used to cache any physical translations that do not have full type of access privilege (e.g., do not permit read, write, and execute). This may tend to reduce performance, but may be appropriate for certain implementations.

Various embodiments have been described above, although other embodiments are contemplated. In one alternate embodiment, an access type protected memory portion may be access type protected whether or not it is operation mode protected. In another alternate embodiment, different on-die processor logic may each have a different set of one or more access type protected memory portions. Still other embodiments will be apparent to those skilled in the art and having the benefit of the present disclosure.

To avoid obscuring the description, simplified processors have been shown and described herein. In other embodiments, a processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, or other components included in conventional processors. Embodiments may have multiple cores, logical processors, or execution engines. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type.

As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
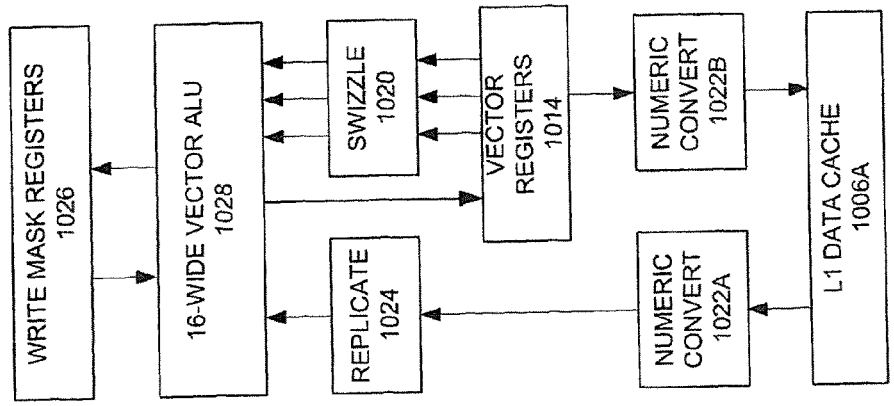
FIG. 10B is an expanded view of part of the processor core in FIG. 10A according to embodiments of the invention.
Figure 10A:
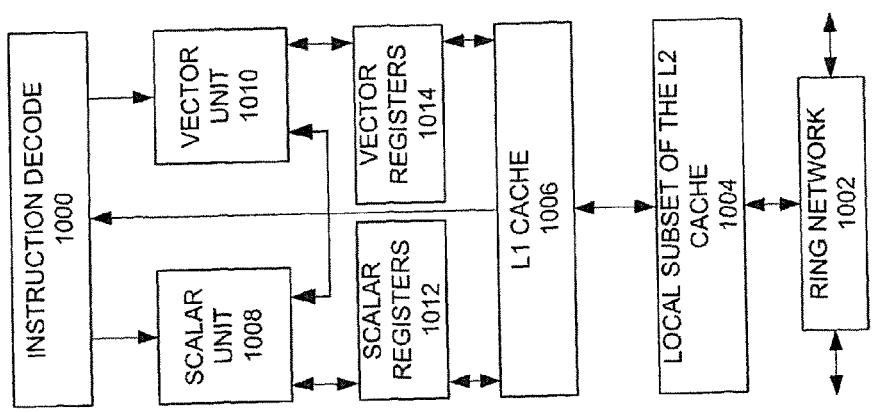
FIG. 10A is a block diagram of a single processor core, along with its connection to the on-die interconnect network and with its local subset of the Level 2 (L2) cache, according to embodiments of the invention.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bidirectional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
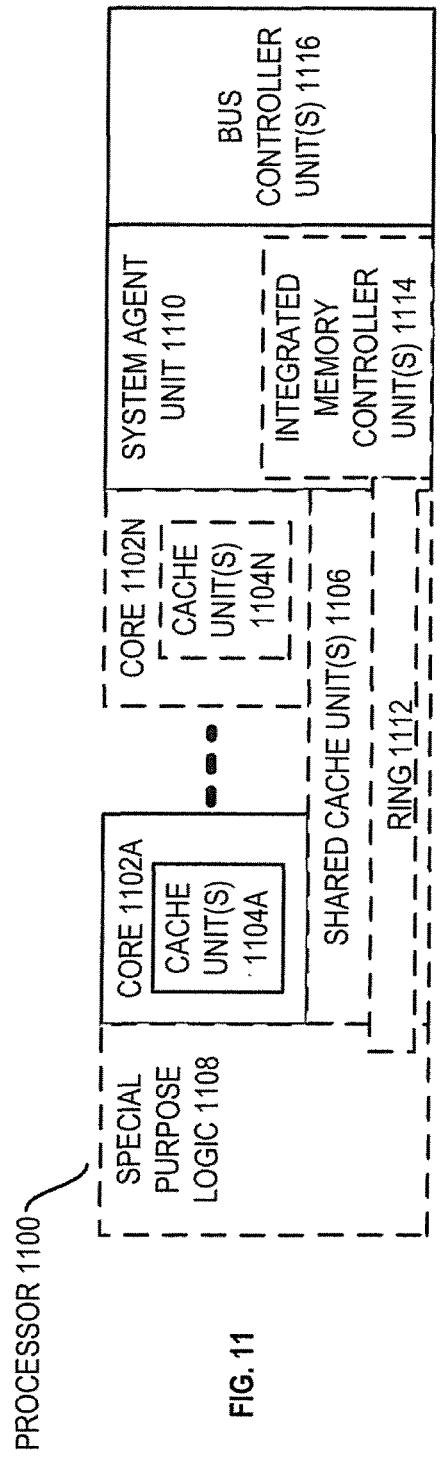
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
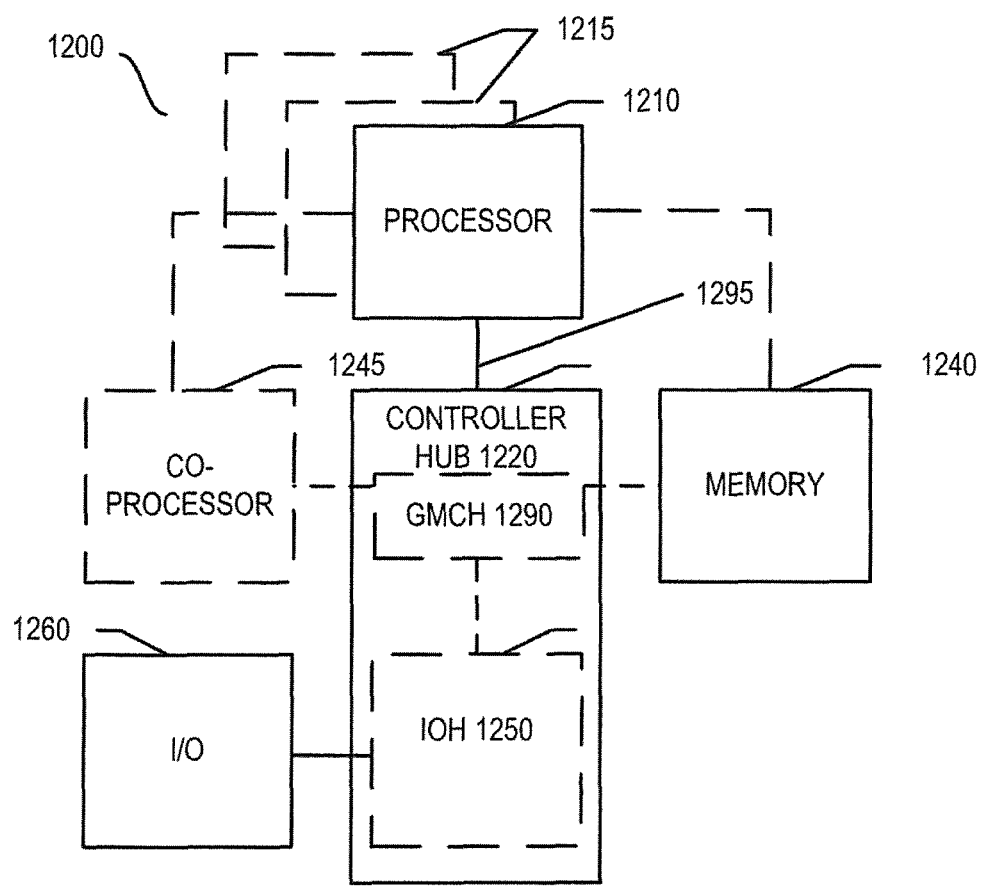
FIG. 12, shown is a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
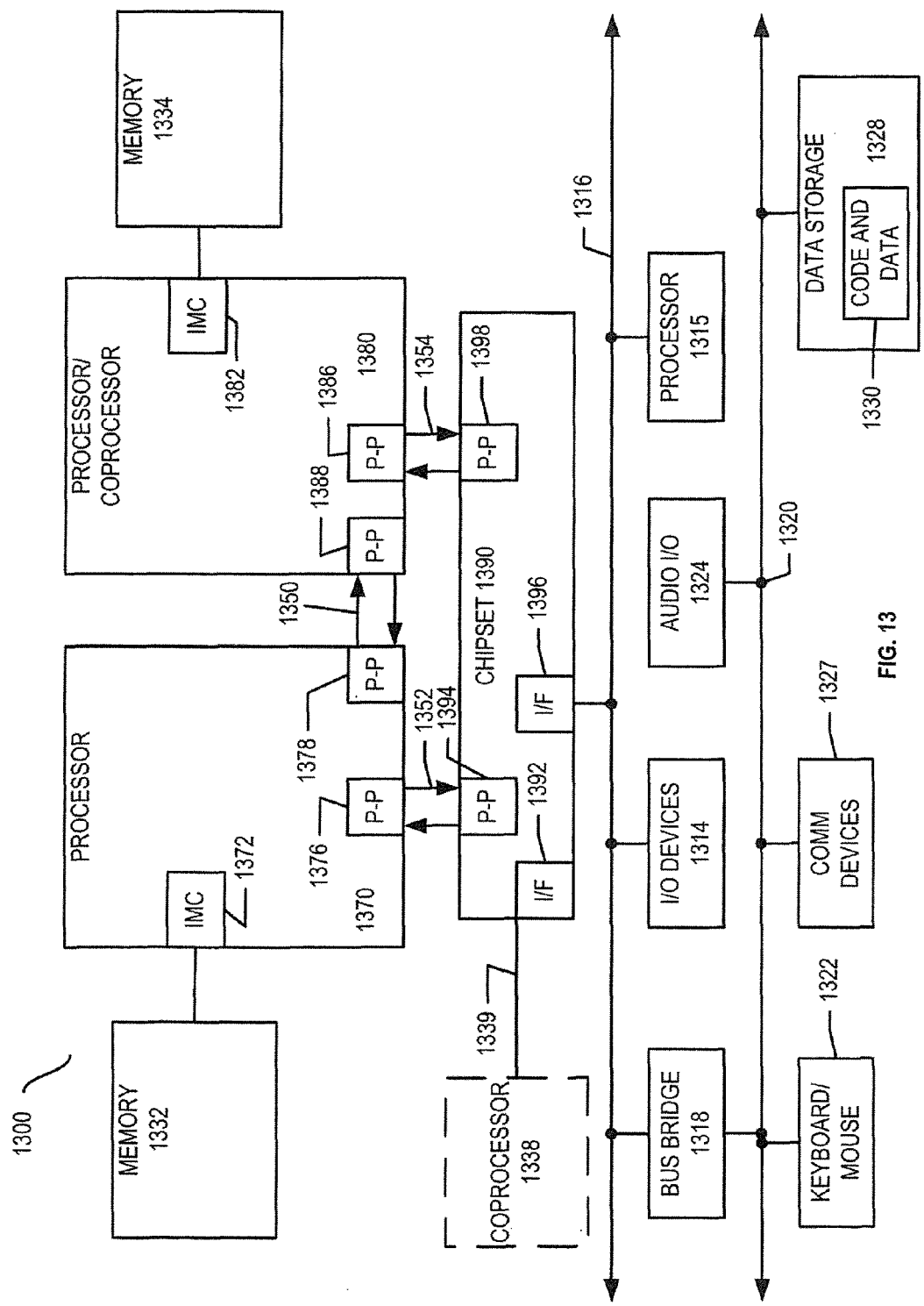
FIG. 13, shown is a block diagram of a first more specific exemplary system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
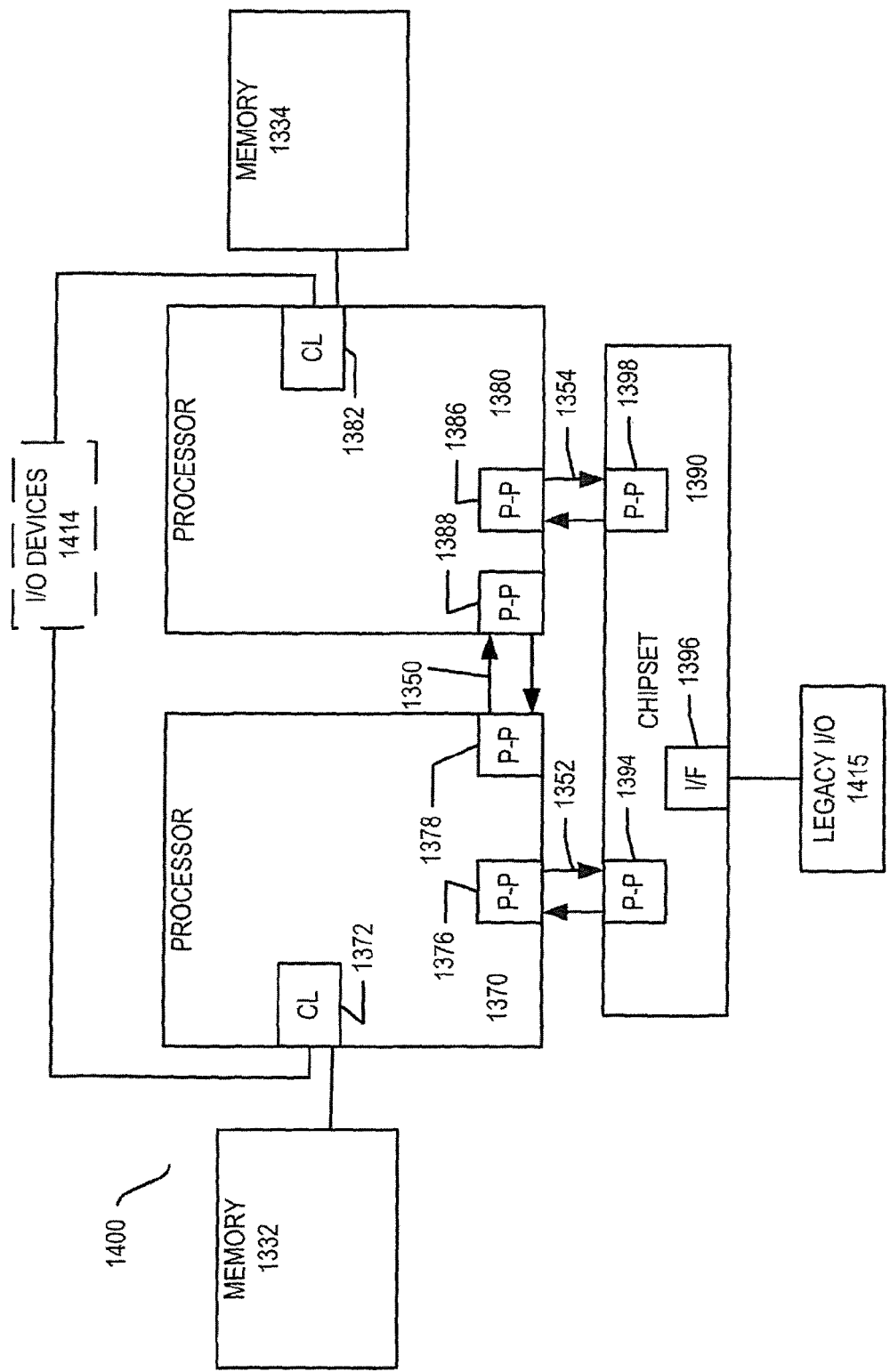
FIG. 14, shown is a block diagram of a second more specific exemplary system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
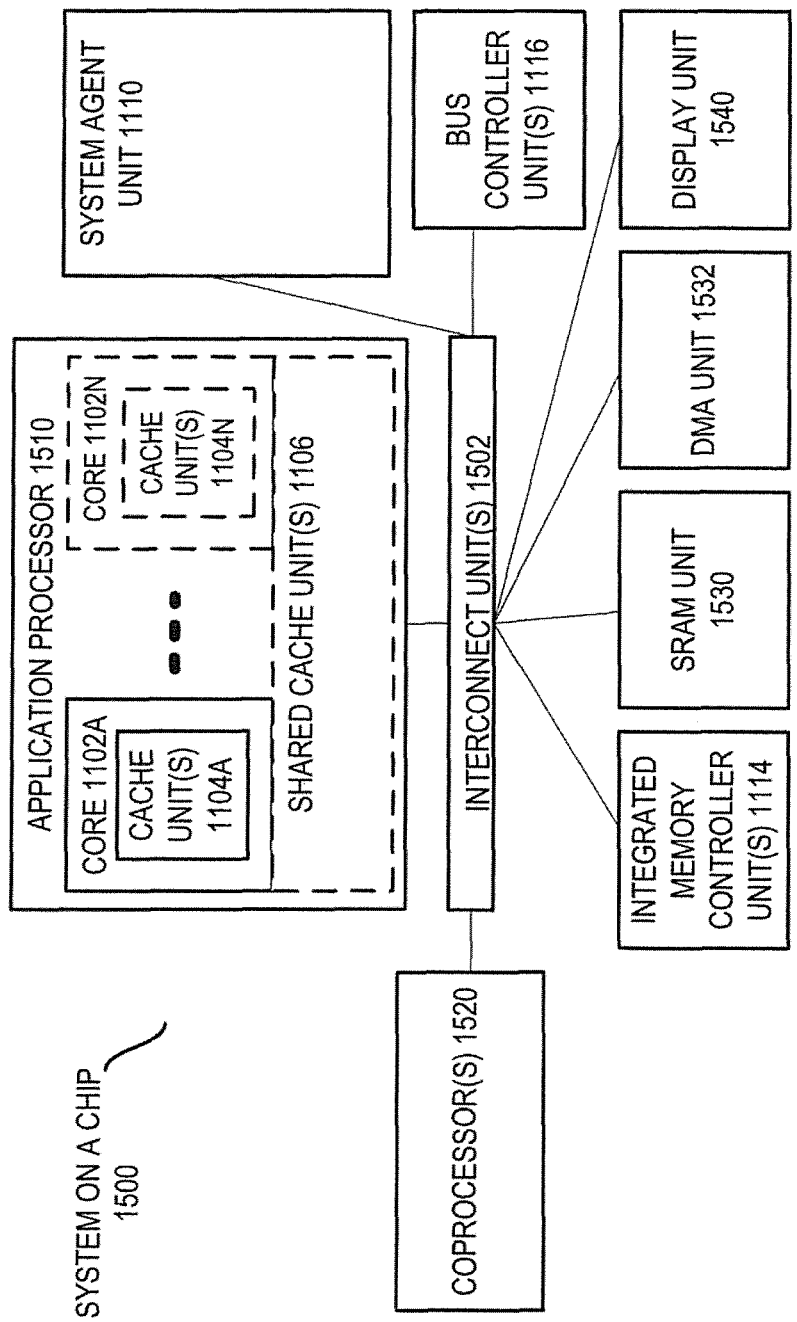
FIG. 15, shown is a block diagram of a SoC in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, reference numerals have been repeated among the figures to indicate components that may optionally be substantially the same and have similar characteristics. In other instances, terminal portions of reference numerals have been repeated among the figures to indicate corresponding or analogous elements, which may optionally have similar or the same characteristics unless specified or clearly apparent otherwise. In some cases, where multiple components have been shown and described, they may be incorporated into a single component. In other cases, where a single component has been shown and described, it may be separated into two or more components. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
    operation mode check logic to determine whether to allow an attempted access to an operation mode and access type protected memory, which is to be reserved for use by an on-die persistent security-related processor logic that includes only a subset of the processor and comprises one or more of on-die hardware and on-die firmware but not for use by software that is to be executed on the processor, based on an operation mode that is to indicate whether the attempted access is by the on-die security-related processor logic or the attempted access is by the software;
    access type check logic to determine whether to allow the attempted access to the operation mode and access type protected memory based on an access type of the attempted access to the operation mode and access type protected memory; and
    protection logic coupled with the operation mode check logic, and coupled with the access type check logic, the protection logic to deny the attempted access to the operation mode and access type protected memory if at least one of the operation mode check logic and the access type check logic determines not to allow the attempted access.

2. The processor of claim 1, wherein the operation mode check logic is to determine to allow the attempted access if the operation mode indicates that the attempted access is by the on-die security-related processor logic and is to determine not to allow the attempted access if the operation mode indicates the attempted access is by the software.

3. The processor of claim 1, further comprising logic to determine that a physical address of the attempted access is within the operation mode and access type protected memory by determining whether the physical address is within a plurality of other operation mode protected memories and evaluating a logical combination of whether the physical address is within the other operation mode protected memories.

4. The processor of claim 1, wherein the access type is one of read, write, and execute.

5. The processor of claim 1, wherein the operation mode check logic is to determine to allow the attempted access to the operation mode and access type protected memory if the operation mode indicates that the attempted access is by the on-die security-related processor logic, and wherein the access type check logic is to determine to allow the attempted access to the operation mode and access type protected memory if the access type of the attempted access matches one or more allowed access types corresponding to the operation mode and access type protected memory.

6. The processor of claim 1, further comprising:
logic to determine that a physical address of the attempted access is within the operation mode and access type protected memory by determining whether the physical address is within a plurality of other operation mode protected memories and evaluating a logical combination of whether the physical address is within the other operation mode protected memories; and
a translation lookaside buffer (TLB) having access type check and protection logic to check and protect against the attempted access with the physical address to the operation mode and access type protected memory via the TLB.

7. The processor of claim 1, further comprising at least one register to indicate a set of one or more allowed access types for the operation mode and access type protected memory, and wherein the access type check logic is to determine whether to allow the attempted access by comparing the access type of the attempted access to the set of the one or more allowed access types indicated by the at least one register.

8. The processor of claim 7, wherein the at least one register is to explicitly specify the set of the one or more allowed access types.

9. The processor of claim 7, wherein the set of the one or more allowed access types are to be implicit to the at least one register.

10. The processor of claim 1, further comprising a translation lookaside buffer (TLB) having access type check and protection logic to check and protect against an attempted access with a physical address to the operation mode and access type protected memory via the TLB.

11. The processor of claim 10, wherein the access type check and protection logic of the TLB is to prevent the attempted access with the physical address to the operation mode and access type protected memory if an access type of the attempted access with the physical address is not among a set of one or more allowed access types that are to be indicated by a corresponding entry of the TLB.

12. The processor of claim 11, wherein paging attribute bits of the entry are to indicate the set of the one or more allowed access types, and wherein corresponding paging attribute bits in corresponding positions in other entries are to be used for virtual to physical address translations and for virtual address protection by one or more of an operating system and a virtual machine monitor.

13. The processor of claim 11, wherein bits of the entry that are to indicate the set of the one or more allowed access types are different than paging attribute bits of the entry that are to be used for virtual to physical address translations.

14. A method comprising:
determining that an operation mode of an attempted access to an operation mode and access type protected memory is allowed because the attempted access is by an on-die permanent security-related processor logic that is only a portion of a processor that is implemented in one or more of on-die hardware and on-die firmware not by software executing on the processor, wherein the operation mode indicates whether the attempted access is by the on-die permanent security-related processor logic or the attempted access is by the software;
determining that an access type of the attempted access to the operation mode and access type protected memory is not allowed; and
denying the attempted access to the operation mode and access type protected memory by the on-die security-related processor logic based on the determination that the access type of the attempted access is not allowed.

15. The method of claim 14, wherein the operation mode of the attempted access would not be allowed if the attempted access was by the executing software.

16. The method of claim 14, further comprising determining that a physical address of the attempted access is within the operation mode and access type protected memory by:
determining whether the physical address is within a plurality of other operation mode protected memories; and
evaluating a logical combination with the determinations of whether the physical address is within the other operation mode protected memories.

17. The method of claim 14, wherein determining comprises determining that at least one of a read, write, and execute access type is not allowed.

18. The method of claim 14, wherein determining that the access type is not allowed comprises:
comparing the access type of the attempted access with all of one or more allowed access types indicated by at least one register that corresponds to the operation mode and access type protected memory; and
determining that the access type of the attempted access is different than all of the allowed access types indicated by the at least one register.

19. The method of claim 18, wherein the at least one register explicitly specifies the one or more allowed access types.

20. The method of claim 18, wherein the one or more allowed access types are implicit to the at least one register.

21. The method of claim 14, wherein determining that the access type is not allowed comprises determining that the access type of the attempted access does not match a set of one or more allowed access types indicated in an entry of a translation lookaside buffer (TLB) that corresponds to the attempted access.

22. The method of claim 21, wherein paging attribute bits of the entry indicate the one or more allowed access types, and wherein corresponding paging attribute bits of other entries are used for virtual to physical address translations and for virtual address protection by one or more of an operating system and a virtual machine monitor.

23. The method of claim 21, wherein bits of the entry that indicate the one or more allowed access types are different than paging attribute bits of the entry that are used for virtual to physical address translations.

24. A system comprising:
a communication device;
an audio I/O;
a memory having an operation mode and access type protected memory region; and
a processor coupled with the memory, the processor including:
operation mode check logic to determine whether to allow an attempted access to the operation mode and access type protected memory region based on an operation mode that is to indicate whether the attempted access is by software executing on the processor or an on-die permanent logic that represents only a portion of the processor and is selected from hardware, firmware, and a combination thereof, wherein the operation mode check logic is to determine not to allow the attempted access if the attempted access is from the software executing on the processor;
access type check logic to determine whether to allow the attempted access to the operation mode and access type protected memory region based on an access type of the attempted access to the operation mode and access type protected memory region, wherein the access type is selected from a read, a write, and an execute; and
protection logic coupled with the operation mode check logic, and coupled with the access type check logic, the protection logic to deny the attempted access to the operation mode and access type protected memory region if at least one of the operation mode check logic and the access type check logic determines not to allow the attempted access.

25. The system of claim 24, further comprising at least one register to indicate a set of one or more allowed access types for the operation mode and access type protected memory region.

26. The system of claim 24, further comprising a translation lookaside buffer (TLB) having access type check and protection logic to check and protect against an attempted access with a physical address to the operation mode and access type protected memory via the TLB.

27. The system of claim 24, wherein the memory is a dynamic random access memory, and wherein the processor further comprises a translation lookaside buffer (TLB) having access type check and protection logic to check and protect against the attempted access with the physical address to the operation mode and access type protected memory via the TLB.

28. A processor comprising:
operation mode check logic to determine to allow an attempted access to an operation mode and access type protected memory when an operation mode indicates that the attempted access is by an on-die persistent processor logic comprising one or more of firmware and hardware and that is present on the processor even when the processor is powered off and to determine to deny the attempted access to the operation mode and access type protected memory when the operation mode indicates that the attempted access is by software;
access type check logic to determine whether to allow the attempted access to the operation mode and access type protected memory based on an access type of the attempted access to the operation mode and access type protected memory; and
protection logic coupled with the operation mode check logic, and coupled with the access type check logic, the protection logic to deny the attempted access to the operation mode and access type protected memory if at least one of the operation mode check logic and the access type check logic determines not to allow the attempted access.

29. The processor of claim 28, further comprising at least one register to indicate a set of one or more allowed access types for the operation mode and access type protected memory, and wherein the access type check logic is to determine whether to allow the attempted access by comparing the access type of the attempted access to the set of the one or more allowed access types indicated by the at least one register.

30. The processor of claim 28, further comprising a translation lookaside buffer (TLB) having access type check and protection logic to check and protect against an attempted access with a physical address to the operation mode and access type protected memory via the TLB.

31. The processor of claim 28, further comprising:
logic to determine that a physical address of the attempted access is within the operation mode and access type protected memory by determining whether the physical address is within a plurality of other operation mode protected memories and evaluating a logical combination of whether the physical address is within the other operation mode protected memories; and
a translation lookaside buffer (TLB) having access type check and protection logic to check and protect against the attempted access with the physical address to the operation mode and access type protected memory via the TLB.

32. The processor of claim 28, wherein the on-die persistent processor logic represents only a subset of security logic of the processor.

33. A processor comprising:
an on-die processor logic, wherein the on-die processor logic represents only a portion of the processor;
operation mode check logic of the processor to determine whether to allow an attempted access to an operation mode and access type protected memory based on an operation mode that is to indicate whether the attempted access is by the on-die processor logic or by software that is to execute on the processor, wherein the operation mode and access type protected memory is to be accessed by the on-die processor logic but not by software to be executed on the processor;
access type check logic of the processor to determine whether to allow the attempted access to the operation mode and access type protected memory based on an access type of the attempted access to the operation mode and access type protected memory; and
protection logic of the processor coupled with the operation mode check logic, and coupled with the access type check logic, the protection logic to deny the attempted access to the operation mode and access type protected memory if at least one of the operation mode check logic and the access type check logic determines not to allow the attempted access.

34. A processor comprising:
operation mode check logic to determine whether to allow an attempted access to an operation mode and access type protected memory based on an operation mode that is to indicate whether the attempted access is by an on-die processor logic or by software that is to execute on the processor;
access type check logic to determine whether to allow the attempted access to the operation mode and access type protected memory based on an access type of the attempted access to the operation mode and access type protected memory; and
protection logic coupled with the operation mode check logic, and coupled with the access type check logic, the protection logic to deny the attempted access to the operation mode and access type protected memory if at least one of the operation mode check logic and the access type check logic determines not to allow the attempted access; and
a translation lookaside buffer (TLB) having access type check and protection logic to check and protect against an attempted access with a physical address to the operation mode and access type protected memory via the TLB, wherein the on-die processor logic is to access the TLB with a physical address.

* * * * *